UNITED STATES PATENT OFFICE.

ALLAN B. KAY AND ROBERT A. KAY, OF NEWARK, NEW JERSEY.

IMPROVEMENT IN PROCESSES OF HARDENING PLASTER-OF-PARIS.

Specification forming part of Letters Patent No. 196,671, dated October 30, 1877; application filed August 31, 1877.

*To all whom it may concern:*

Be it known that we, ALLAN B. KAY and ROBERT A. KAY, each of Newark, in the county of Essex and in the State of New Jersey, have invented certain new and useful Improvements in the Process of Hardening Plaster-of-Paris; and do hereby declare that the following is a full, clear, and exact description thereof.

The design of our invention is to enable articles formed from plaster-of-paris to be made hard and brittle, like glass; and it consists in saturating plaster-of-paris casts with liquid alum, substantially as is hereinafter specified.

In the use of our process the articles to be hardened are cast in molds, in the usual way, and then dried, after which they are soaked in liquid alum, which liquid is formed by the application of heat to pure crystallized alum.

After removal from the liquid alum the plaster-of-paris articles are permitted to dry, and are then coated with varnish or lacquer, which is insoluble in water, for the purpose of protecting them from dampness.

Articles thus treated have nearly the hardness and brittleness of glass, and are capable of use in many places where glass has heretofore been required.

We are aware that alum in solution has before been employed for hardening plaster, and make no claim to its use in such form.

Having thus fully set forth the nature and merits of our invention, what we claim as new is—

The hereinbefore-described process for hardening plaster-of-paris by immersing articles constructed therefrom in melted liquid alum, substantially as specified.

In testimony that we claim the foregoing we have hereunto set our hands and seals this 29th day of August, 1877.

ALLAN B. KAY. [L. S.]
        ROBERT A. KAY. [L. S.]

Witnesses:
    CHAS. K. WESTBROOK,
    WILLIAM H. SMITH.